US005447438A

United States Patent [19]

Watanabe et al.

[11] Patent Number: 5,447,438

[45] Date of Patent: Sep. 5, 1995

[54] MUSIC TRAINING APPARATUS

[75] Inventors: Kouji Watanabe; Kenji Muraki; Nobuyuki Ogawa; Tatsuhiko Numoto, all of Osaka, Japan

[73] Assignee: Matsushita Electric Industrial Co., Ltd., Osaka, Japan

[21] Appl. No.: 136,004

[22] Filed: Oct. 14, 1993

[30] Foreign Application Priority Data

Oct. 14, 1992 [JP] Japan .................................. 4-275701

[51] Int. Cl.[6] .................................................. G09B 5/00

[52] U.S. Cl. ................................ 434/307 A; 434/318; 84/645; 369/48

[58] Field of Search ............... 434/307 R, 307 A, 308, 434/309, 318, 365; 84/454, 477 R, 601, 609, 615, 645; 369/32, 48; 360/32, 33.1, 77.01; 395/154, 160; 358/335, 342; 345/141, 143; 348/478, 484, 571, 595, 738

[56] References Cited

U.S. PATENT DOCUMENTS

| | | | |
|---|---|---|---|
| 4,630,301 | 12/1986 | Hohl et al. | 381/36 |
| 5,151,793 | 9/1992 | Ito et al. | 358/335 |
| 5,208,413 | 5/1993 | Tsumura et al. | 434/307 A |
| 5,286,907 | 2/1994 | Okamura et al. | 84/601 |
| 5,296,643 | 3/1994 | Kuo et al. | 84/477 R |

FOREIGN PATENT DOCUMENTS

| | | |
|---|---|---|
| 0488732 | 6/1992 | European Pat. Off. . |
| 0509766 | 10/1992 | European Pat. Off. . |
| 204095 | 11/1984 | Japan . |

*Primary Examiner*—Joe H. Cheng
*Attorney, Agent, or Firm*—Pollock, Vande Sande & Priddy

[57] ABSTRACT

A music training apparatus performs a two-part reproduction including first and second parts, in which the first part is like a trial part which allows a video signal to be reproduced on a display unit but prohibits a sound signal to be generated from a speaker. The second part is like a formal part which allows an ordinary reproduction of both the video and sound signals. In the first part, a first pitch detector detects a pitch of a model singing signal memorized in a recording medium. Meanwhile, a second pitch detector detects a pitch of user's singing signal inputted from a microphone. If the pitches detected by the first and second pitch detectors are different from each other, an interval adjusting device changes the key so as to be in perfect pitch with each other before terminating the first part. Thereafter, in the second part, the reproduction of sound through the speaker formally starts from the head of the music under an ideal condition where the interval is automatically and exactly adjusted to fit to the user's singing sound.

14 Claims, 9 Drawing Sheets

FIG. 5
FILTERING
R COUNTER COUNT-UP
Rch ZERO-CROSS ?
R LEVEL>REFERENCE VALUE ?
TRANSFER INTO A DELIVERY BUFFER R
R COUNTER INITIALIZATION
L COUNTER COUNT-UP
Lch ZERO-CROSS ?
L LEVEL>REFERENCE VALUE ?
TRANSFER INTO A DELIVERY BUFFER L
L COUNTER INITIALIZATION
DSP IS DELIVERING DATA ?
DELIVERY BUFFER CONTAINS DATA ?
INITIATE DATA TRANSFER AND DELIVERY TO SO REGISTER
CLEAR DELIVERY BUFFER

MUSIC TRAINING APPARATUS

BACKGROUND OF THE INVENTION

1. Field of the Invention

The present invention relates generally to a music training apparatus using a recording medium memorizing an accompaniment and a model singing or play sound, and more particularly to a music training apparatus capable of adjusting the interval (i.e. key) of the accompaniment in accordance with user's singing or play compass.

2. Description of the Related Art

A karaoke machine, known as a conventional music training apparatus, is a musical device having been developed in Japan for entertainment, which reproduces the accompaniment music memorized in a recording medium and mixes this accompaniment music with a user's musical signal: for example, singing or playing sound collected through a microphone. Recent development in this karaoke machine allows users to freely change the key of the accompaniment music.

For example, Japanese Patent Provisional Publication No. 204095/84 discloses such a conventional karaoke machine equipped with the key adjusting device. However, this conventional karaoke machine forces the user to perform complicated adjusting operations.

More specifically, this conventional karaoke machine comprises: frequency analyzing means for analyzing the frequency of a sound signal to make a judgement as to whether this sound signal is high or low; compass checking means for checking compasses of both the accompaniment music signal and the user's singing signal beforehand on the basis of the judgement result of the frequency analyzing means; frequency shift amount determining means for determining a frequency shift amount on the basis of the compasses of said two signals checked by said compass checking means; and frequency shift means for shifting the frequency of the accompaniment music signal in accordance with the shift amount determined by said frequency shift amount determining means.

An operation of above conventional karaoke machine will be explained below.

First of all, the frequency of the music signal to be reproduced from the recording medium is analyzed by the frequency analyzing means. Then, in accordance with the result of this frequency analysis, both the most highest and lowest sounds are detected by the compass checking means.

This frequency analysis requires the user to successively pronounce "do, re, mi, - - -" sounds so that the compass checking means can correctly detect the user's range of voice.

Then, the frequency shift amount determining means compares the compass between the recording medium's music sound and the user's voice, so as to determine a suitable frequency shift amount. For example, if the compass of the recording medium's music sound is higher than that of the user's voice, the frequency shift amount is determined to effectively reduce the key of the recording medium. Accordingly, since the frequency shift means changes the key of the recording medium in accordance with the frequency shift amount, it becomes possible to reproduce the sound so as to fit to the user's range of voice.

However, this conventional karaoke machine disadvantageous in that the user is forcibly required to successively pronounce "do, re, mi, - - -" sounds until the compass checking means correctly detects the user's range of voice. In fact, it will take a long time before actually allowing the user to sing a song. Especially, such a complicated and time-consuming operation will not be acceptable for the people who are enjoying a karaoke party using the same karaoke machine.

SUMMARY OF THE INVENTION

Accordingly, in view of above-described problems encountered in the prior art, an object of the present invention is to provide a music training apparatus capable of automatically adjusting the key so as to fit to the user's singing or play sound without being bothered by the complicated setting of the key.

In order to accomplish above purpose, a first aspect of the present invention provides a music training apparatus comprising: reproduction means for reproducing a recording medium memorizing accompaniment music; first pitch detecting means for detecting a pitch of a first signal outputted from the reproduction means; input terminal means for inputting a second signal representing user's singing or play sound; second pitch detecting means for detecting a pitch of the second signal; comparing means for comparing output signals from the first and second pitch detecting means; interval adjusting means inputting an output signal from the reproduction means for changing a frequency ratio of its output signal to its input signal in response to an output signal from the comparing means; output signal ON/OFF means for gate controlling an output signal of the interval adjusting means in response to a gate control signal; control means for controlling the reproduction means and the output signal ON/OFF means; and adding means for adding the output signal from the interval adjusting means and the second signal. The reproduction means performs a two-part reproduction including first and second parts, in which the first part is like a trial part which allows only a video signal to be reproduced on a display unit and prohibits a sound signal to be generated from a speaker. The second part is like a formal part which performs an ordinary reproduction of both the video and sound signals.

With this arrangement, in the first part of two-part reproduction, only the video signal is reproduced and no accompaniment music is reproduced from the speaker. Therefore, the user can freely enjoy singing or playing in a relaxing mood seeing words displayed on the screen. During this first part, the pitch of the second signal collected from the input terminal means (i.e. microphone) is compared with the pitch of the first signal memorized in the recording medium. If a time-averaged value of the pitch of the first signal is different from that of the pitch of the second signal, the interval adjusting means changes the key in accordance with the difference of pitch between the first and second signals, so as to be in perfect pitch before terminating the first part. Thereafter, in the second part of ordinary reproduction of the video signal and sound signal, the reproduction of sound through the speaker formally starts from the head of the music under an ideal condition that the interval is automatically and exactly adjusted to fit to the user's singing or play sound.

Furthermore, a second aspect of the present invention provides a music training apparatus comprising: reproduction means for reproducing a recording medium memorizing accompaniment music; signal separating means for separating a singing or play signal from an output signal of the reproduction means; first pitch detecting means for detecting a pitch of a first signal outputted from the signal separating means; input terminal means for inputting a second signal representing user's singing or play sound; second pitch detecting means for detecting a pitch of the second signal; comparing means for comparing output signals from the first and second pitch detecting means; interval adjusting means inputting an output signal from the reproduction means for changing a frequency ratio of its output signal to its input signal in response to an output signal from the comparing means; output signal ON/OFF means for gate controlling an output signal of the interval adjusting means in response to a gate control signal; control means for controlling the reproduction means and the output signal ON/OFF means; and adding means for adding the output signal from the interval adjusting means and the second signal.

With this arrangement, even if the recording medium does not memorize the singing or play signal independently, the signal separating means can separate the first signal. Therefore, the first pitch detecting means can detect an interval of the first signal. Then, the interval of the first signal is compared with the interval of the user's sound interval detected through the second pitch detecting means. And, thereafter, the key of the accompaniment music is adjusted on the basis of the comparison result.

The above and other objects, features and advantages of the present invention will become more apparent from the following detailed description which is to be read in conjunction with the accompanying drawings.

DETAILED DESCRIPTION OF THE PREFERRED EMBODIMENT

Hereinafter, with reference to accompanying drawings, a preferred embodiment of the present invention will be explained in detail.

In the following description, a karaoke machine and a laser disk will be explained as the music training apparatus and the recording medium, respectively.

Figure 1:
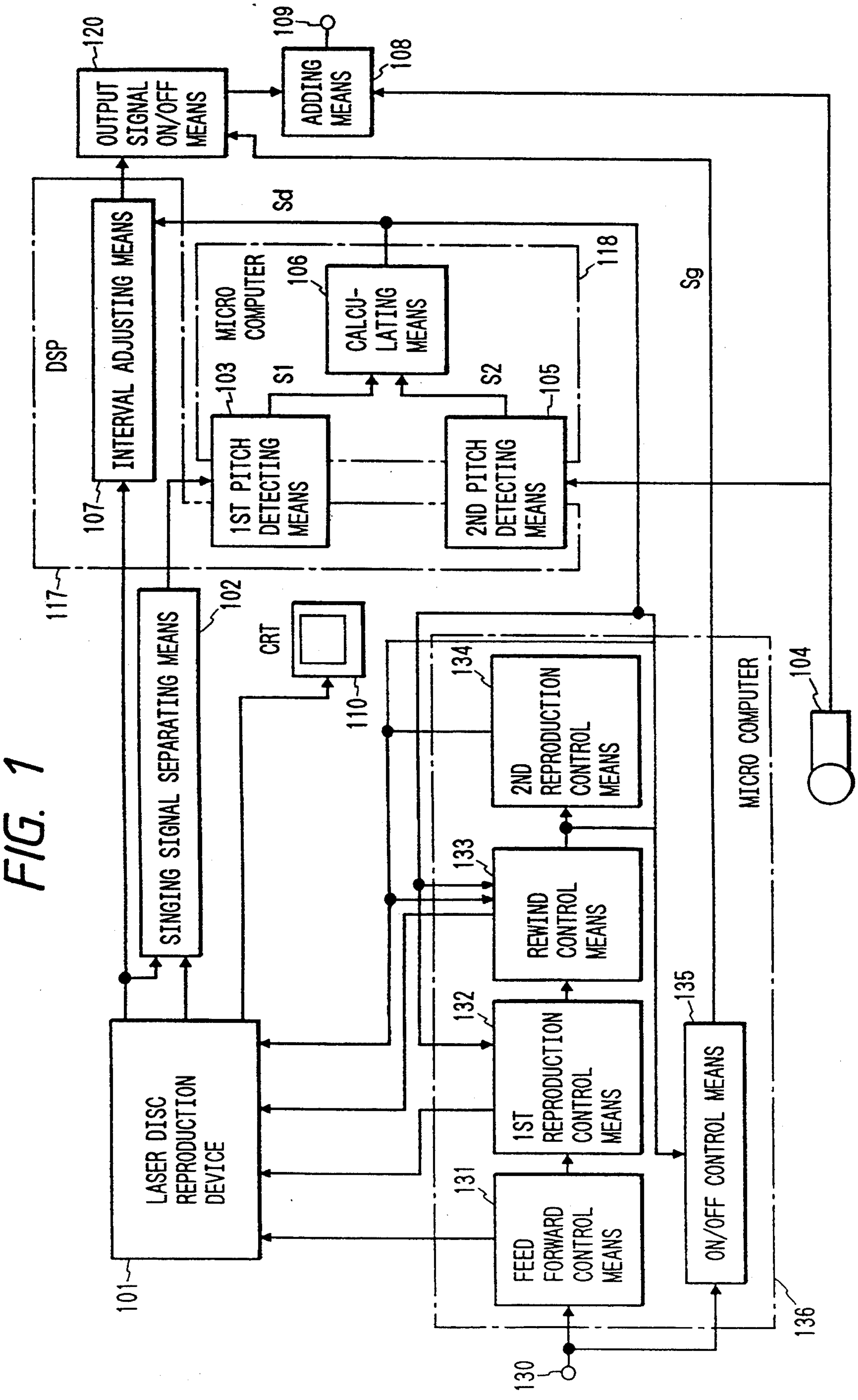
FIG. 1 is a block diagram showing one embodiment of the music training apparatus in accordance with the present invention.

In FIG. 1, a reference numeral 101 represents a laser disk reproduction apparatus, and a reference numeral 102 represents a signal separating means for separating a singing or play signal from an output signal of the reproduction apparatus 101. A reference numeral 103 represents a first pitch detecting means for detecting a pitch of a first signal outputted from the signal separating means 102, and a reference numeral 104 represents a microphone serving as an input terminal means for inputting a second signal representing user's singing or play sound. A reference numeral 105 represents a second pitch detecting means for detecting a pitch of the second signal. A reference numeral 106 represents a calculating means for obtaining the difference between output signals from the first and second pitch detecting means 103 and 105. A reference numeral 107 represents an interval adjusting means inputting an output signal from the reproduction apparatus 101 for changing a frequency ratio of its output signal to its input signal in response to an output signal from the calculating means 106. A reference numeral 120 represents an output signal ON/OFF means for gate controlling an output signal of the interval adjusting means 107.

A reference numeral 130 represents a start signal input means for inputting a start signal. A reference numeral 131 represents a feed forward control means for controlling the reproduction apparatus 101 in response to the start signal received by the start signal input means 130 so as to feed forward the recording medium to a starting point of the first signal (i.e. a beginning point of a singing or play signal). A reference numeral 132 represents a first reproduction control means initiating its operation in response to an operation finish signal fed from the feed forward control means 131 for performing a reproduction of the recording medium from the starting point of the first signal until the calculating means 108 completes its calculating operation. A reference numeral 133 represents a rewind control means initiating its rewind operation in response to an operation finish signal fed from the first reproduction control means 132 and a calculation finish signal fed from the calculating means 108 for rewinding the recording medium to a head of the corresponding music.

Furthermore, a reference numeral 134 represents a second reproduction control means initiating its operation in response to an operation finish signal fed from the rewind control means 133 for performing an ordinary reproduction of the recording medium from the head (i.e. very beginning) of the corresponding music. A reference numeral 135 represents an ON/OFF control means for deactivating the output signal ON/OFF means 120 in an OFF condition after the start signal is inputted from the start signal input means 130 until the rewind control means 133 completes its rewind operation, and activating the same in an ON condition when the second reproduction control means 134 performs the ordinary reproduction.

A reference numeral 108 represents an adding means for adding the output signal from the output signal ON/OFF means 120 (the interval adjusting means 107) and the second signal. A reference numeral 109 represents an output terminal of the adding means 108, which is connected to a speaker (not shown). A reference numeral 110 represents a video terminal (abbreviated as CRT, hereinafter) for reproducing the video signal outputted from the laser disk reproduction apparatus 101.

The feed forward control means 131, the first reproduction control means 132, the rewind control means 133, the second reproduction control means 134, and the ON/OFF control means 135 are constituted by a micro computer 136.

An operation of the music training apparatus (i.e. karaoke machine) in accordance with the present invention will be explained below.

The reproduction apparatus 101 performs a two-part reproduction including first and second parts in response to the control signal fed from the micro computer 136. The first part is like a trial part which allows a video signal to be reproduced on the CRT 110 but prohibits a sound signal to be generated from the speaker. The second part is like a formal part which allows an ordinary reproduction of both the video and sound signals. The first part is characterized in that the key of the accompaniment music is adjusted in accordance with the output signal of the calculating means 106 so as to fit to the user's singing or play sound before terminating the first part.

More specifically, in the first part of the two-part reproduction, the first pitch detecting means 103 detects the pitch of the sound signal (i.e. first signal) outputted from the reproduction apparatus 101 while the second pitch detecting means 105 detects the pitch of the user's sound signal collected through the microphone 104. The calculating means 106 obtains time-averaged values of the sound signals outputted from the first and second pitch detecting means 103 and 105 and obtains a difference between these time-averaged values obtained. In accordance with the difference above calculated, the calculating means 106 generates a control signal Sd and supplies it to the interval adjusting means 107. The interval adjusting means 107 receives this control signal Sd and changes a frequency ratio of its output signal to its input signal in response to the control signal Sd received, so as to adjust the key of the accompaniment music to be in perfect pitch.

Although the output signal of the interval adjusting means 107 is supplied to the output signal ON/OFF means 120, this output signal ON/OFF means 120 is deactivated in an OFF condition in response to a gate signal Sg fed from the ON/OFF control means 135. Thus, no accompaniment music sound is generated from the output terminal 109. Meanwhile, the video signal outputted from the reproduction apparatus 101 is displayed on the CRT 110. The reproduction starting position for the first part would be ideal if it be identical with the point where the singing or play signal is just reproduced; therefore, the feed forward control means 131 controls the reproduction apparatus 101 to feed forward the laser disk to a point corresponding to, for example, a beginning of words or a well-known part of song.

Thereafter, in the second part of the reproduction, the ON/OFF control means 135 generates the gate signal Sg to activate the output signal ON/OFF means 120 into an 0N condition. Thus, the output signal of the interval adjusting means 107 directly passes through the output signal ON/OFF means 120. Thus, the accompaniment music sound having been adjusted in the interval adjusting means 107 is added with the sound signal fed from the microphone 104. Thereafter, an output of the adding means 108 is reproduced from the output terminal 109 connected to the speaker. Meanwhile, the video signal outputted from the reproduction apparatus 101 is displayed on the CRT 110 in the same manner as the first part of the two-part reproduction. The reproduction starting position of the second part should be a head (i.e. a very beginning) of the accompaniment music; therefore, the rewind control means 133 controls the reproduction apparatus 101 to rewind the laser disk to the head thereof.

An operation of the present embodiment will be explained with reference to FIGS. 2 and 3.

Figure 2:
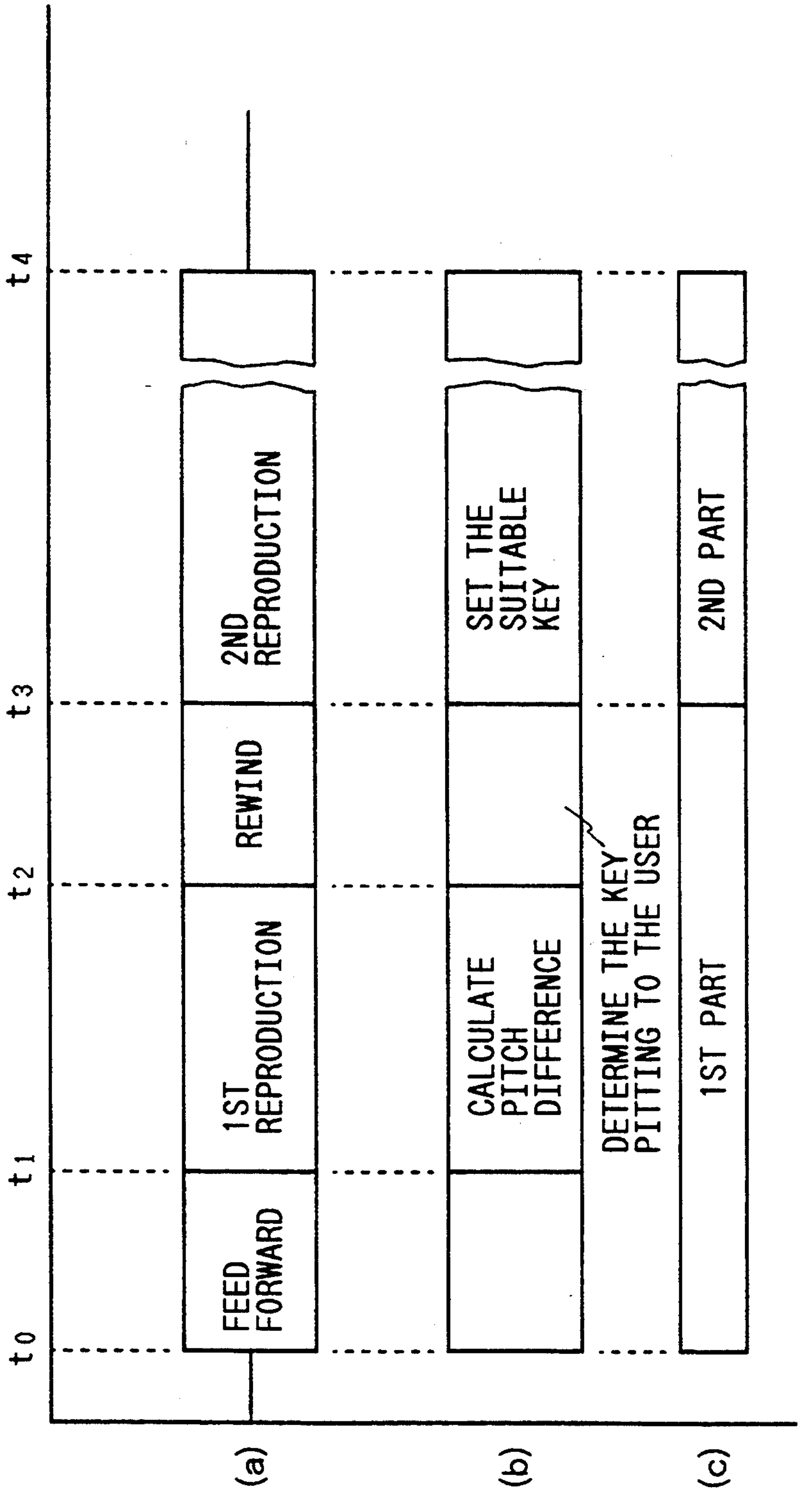
FIG. 2 is a timing chart showing an operation of the above embodiment.
Figure 3:
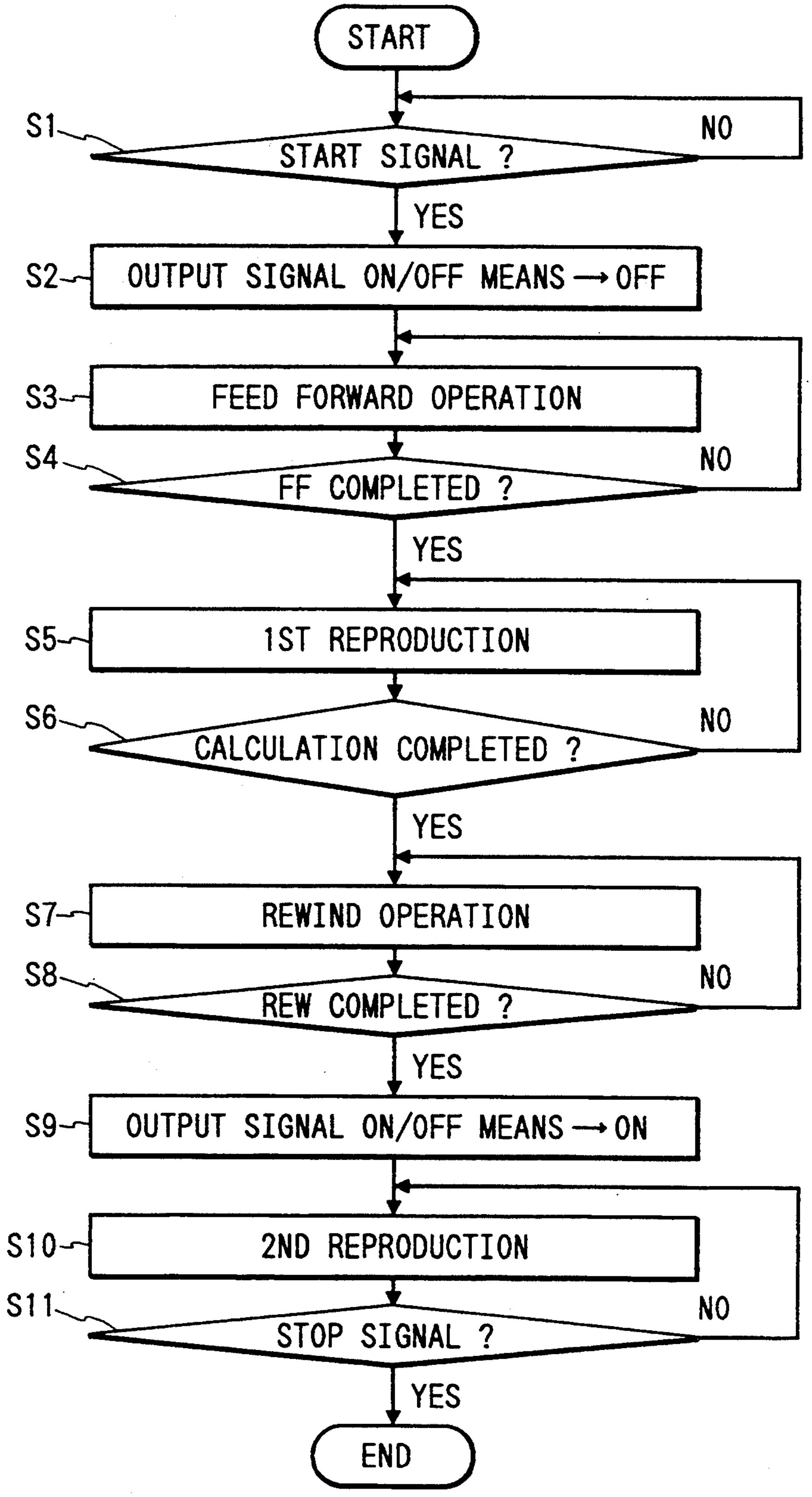
FIG. 3 is a flowchart showing the operation of the above embodiment.

FIG. 2 shows: (a) reproduction action of the laser disk reproduction apparatus 101; (b) calculation content of the calculating means 106; and (c) timing chart of the first and second parts consisting of the two-part reproduction. FIG. 3 is a flowchart showing the operation of the present embodiment.

First of all, a judgement is made as to whether or not the start signal is inputted from the start signal input means 130. (Step S1) If the start signal is inputted, the output signal ON/OFF means 120 is deactivated in an OFF condition in response to the gate signal Sg fed from the ON/OFF control means 135. (Step S2). Thereafter, the two-part reproduction is initiated from the first part.

The first part is like a trial part which starts at a time t0 and terminates at a time t3. From the time t0, the feed forward control means 131 causes the reproduction apparatus 101 to feed forward the laser disk at a fast speed to the point corresponding to, for example, a beginning of words or a well-known part of song. (Step S3) During an interval from the time t0 to the time t1 no sound signal is inputted into the first pitch detecting means 103, although the user's singing or play signal is supplied from the microphone 104 to the second pitch detecting means 105. The calculating means 106 does not perform its calculating operation unless it receives output signals from both the first and second pitch detecting means 103 and 105.

If the feed forward operation is completed (Step S4), the first reproduction control means 132 causes the reproduction apparatus 101 to carry out the first reproduction during an interval from the time t1 to a time t2 (Step S5). Namely, the reproduction apparatus 101 performs the reproduction of both the sound and video signals.

In this case, if the laser disk is a recording source memorizing the data based on the sound multiplex system, the singing or play signal can be picked up or separated by the signal separating means 102. The first pitch detecting means 103 detects a pitch of the singing or play signal having been picked up by the signal separating means 102. The video signal is reproduced on the CRT 110.

Therefore, the user can enjoy freely singing or playing in a relaxing mood seeing words displayed on the screen. The microphone 104 collects the user's singing or play sound, and the second pitch detecting means 105 detects the pitch of the user's singing or play sound on the basis of the signal obtained through the microphone 104. The outputs of the first and second pitch detecting means 103 and 105 are inputted into the calculating means 106, wherein the difference in pitch is obtained. It should be noted that, in this first reproduction period, the sound signal fed from the reproduction apparatus 101 is not reproduced from the speaker. However, the reproduction of the output signal from the microphone 104 can be reproduced as occasion demands. By the way, the user's singing or play sound would include humming sound.

Next, in an interval from the time t2 to a time t3, the calculating means 106 calculates the control signal Sd to be supplied for the interval adjusting means 107 on the basis of the pitch difference obtained. For example, the calculating means 106 determines the control signal Sd in the following manner.

When the pitch of the user's singing or play signal (i.e. second signal) fed from the microphone (i.e. input terminal means) 104 is smaller than the pitch of the sound signal (i.e. first signal) fed from the reproduction apparatus 101, the interval adjusting means 107 reduces the key (i.e. frequency ratio of its output signal to its input signal) in response to the control signal Sd corresponding to the pitch difference.

On the contrary, when the pitch of the user's singing or play signal fed from the microphone 104 is larger than the pitch of the sound signal fed from the reproduction apparatus 101, the interval adjusting means 107 increases the key (i.e. frequency ratio of its output signal to its input signal) in response to the control signal Sd corresponding to the pitch difference. The key of the interval adjusting means 107, having been thus controlled by the determined control signal Sd, is accordingly in perfect pitch with the user's singing or play sound.

Then, if the calculating means 106 completes the above calculation (Step S6), the rewind control means 133 causes the reproduction apparatus 101 to rewind the laser disk to the head (i.e. very beginning) of the music. (Step S7) Then, a judgement is made as to whether or not the rewind operation is completed. (Step S8) If the rewind operation is over, the first part of the two-part reproduction is completed.

Next, the second part of the two-part reproduction will be explained. The second part is like a formal part which carries out an ordinary reproduction of both the sound signal and the video signal. Before starting the second part, the output signal ON/OFF means is activated into an ON condition in response to the gate signal Sg fed from the ON/OFF control means 135. (Step S9) Thereafter, the second reproduction control means 134 causes the reproduction apparatus 101 to carry out the second reproduction. (Step S10).

The second part initiates from the time t3 and terminates at a time t4. At this moment, the interval adjusting means 107 is automatically and exactly adjusted to fit to the user's singing or play sound. Therefore, in this second part, the reproduction of sound through the speaker formally starts from the head of the music under an ideal condition where the interval is perfectly fitted to the user's singing or play sound. Finally, a judgement is made as to whether or not the stop signal is inputted. (Step S11) This stop signal can be inputted from the start signal input means 130 or an appropriate other terminal.

Next, the signal separating means 102 will be explained.

The reproduction apparatus 101 reproduces the signals recorded in the laser disk. Many of laser disks commercially used for karaoke machines are characterized in that the analogue sound is recorded based on the sound multiplex system. The laser disk, based on the sound multiplex system, includes a left channel (abbreviated as Lch) recording the accompaniment signal and a right channel (i.e. Rch) recording both the accompaniment signal and the singing signal. The signal separating means 102 picks up the singing signal alone by subtracting the Lch signal from the Rch signal. The singing signal picked up by the signal separating means 102 is inputted into the first pitch detecting means 103 as a pitch data.

A part of the first and second pitch detecting means 103 and 105 and the interval adjusting means 107 are constituted by a digital signal processor (abbreviated by DSP) 117. The remainder of the first and second pitch detecting means 103 and 105 and the calculating means 106 are constituted by a micro computer 118. For example, an LC83015, manufactured by SANYO, would be appropriate for the DSP because it has a ROM memorizing various signal processing programs including an interval adjusting program. Therefore, the interval adjustment can be achieved by processing the input signal in accordance with this interval adjusting program. Furthermore, the micro computer 118 would be proper if it is 8-bit having machine cycle of approximately 250 μs.

Figure 4:
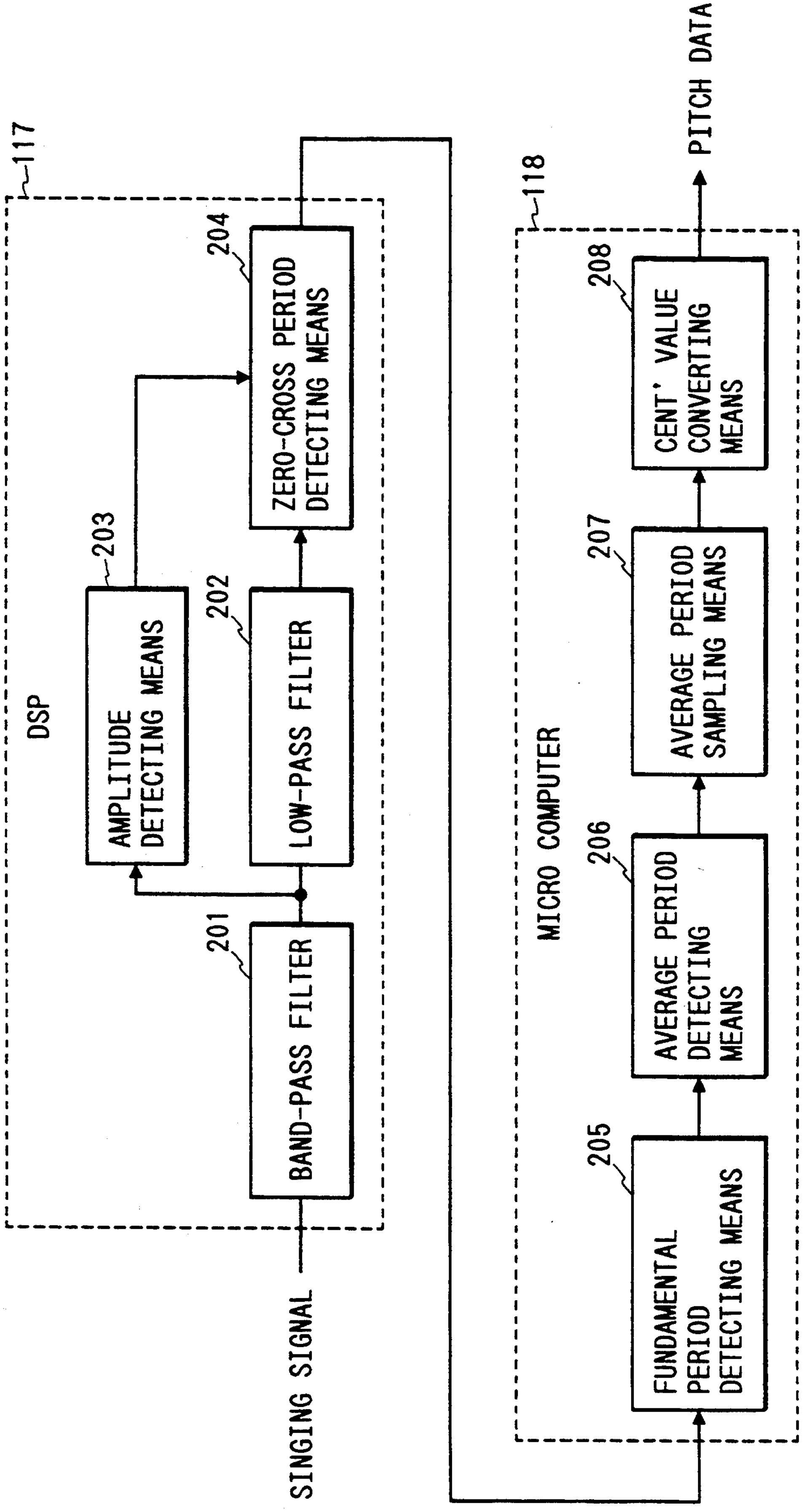
FIG. 4 is a block diagram showing first and second pitch detecting means of the above embodiment.

Next, the first and second pitch detecting means 103 and 105 will be explained. FIG. 4 is a block diagram showing the first pitch detecting means 103. The second pitch detecting means 105 is not disclosed since it has the same configuration as the first pitch detecting means 103.

First of all, the singing signal passes through a band-pass filter 201. The frequency component to be detected is selectively outputted from the band-pass filter 210. An appropriate pass band of the band-pass filter 201 will be 50 Hz–500 Hz. An output of the band-pass filter 201 is supplied to a low-pass filter 202 on one hand and to an amplitude detecting means 203 on the other hand. The low-pass filter 202 attenuates the higher harmonics component and, therefore, the fundamental wave is relatively enhanced. An appropriate cut-off frequency of the low-pass filter 202 would be 100 Hz. Furthermore, the required attenuation characteristics would be 12 dB/octave in the frequency zone higher than the cut-off frequency. The amplitude detecting means 203 generates a signal whose waveform is rectified half. The hold time constant of a signal would be approximately 100 ms. Output signals from the low-pass filter 202 and the amplitude detecting means 203 are both inputted into a zero-cross period detecting means 204.

Next, an operation of the zero-cross period detecting means 204 will be explained with reference to FIG. 5.

Figure 5:
FIG. 5 is a PAD diagram showing the processing of zero-cross point detecting & delivery operation in the above embodiment.

FIG. 5 is a PAD diagram showing the procedure of zero-cross point detecting & delivery operation. In this embodiment, the first pitch detecting means 103 is assigned to the Rch and the second pitch detecting means 105 is assigned to the Lch. As the processing procedures of the Rch and Lch are identical with each other, only the Rch will be explained hereinafter.

The zero-cross period detecting means 204 counts up a zero-cross period counter every sampling cycle. (Step 1) Then, the zero-cross period detecting means 204 makes a judgement as to whether or not a present data outputted from the low-pass filter 202 has the same sign as the preceding data outputted one sample cycle before in order to find out a zero-cross point. (Step 2) If the zero-cross point is detected, it is further judged as to whether or not the amplitude of an output signal from the amplitude detecting means 203 is equal to or larger than a reference value. (Step 3) If the amplitude of the output signal from the amplitude detecting means 203 is equal to or larger than the reference value, it is recognized that the count value is an effective zero-cross period. Then, this count value is transferred into a delivery buffer which is defined in the user RAM of the DSP. (Step 4) The zero-cross period is generally defined as a zero-cross interval expressed in term of sampling period. Thereafter, the zero-cross period counter is reset. (Step 5).

In the case where an SO register has no data (Step 6) and the delivery buffer has data (Step 7), the data of the delivery buffer is transferred into the SO register and read out in response to the clock fed from the micro computer 118. (Step 8) The SO register is provided in the DSP 117 and is used for carrying out the serial communication between the DSP 117 and the microcomputer 118. Subsequently, the delivery buffer is cleared. (Step 9)

Above-described procedure is accomplished in the DSP 117 of the first pitch detecting means 103.

Next, a processing for obtaining the period on the basis of the output of the DSP 117, which is carried out in the micro computer 118 of the first pitch detecting means 103, will be explained.

Figure 6:
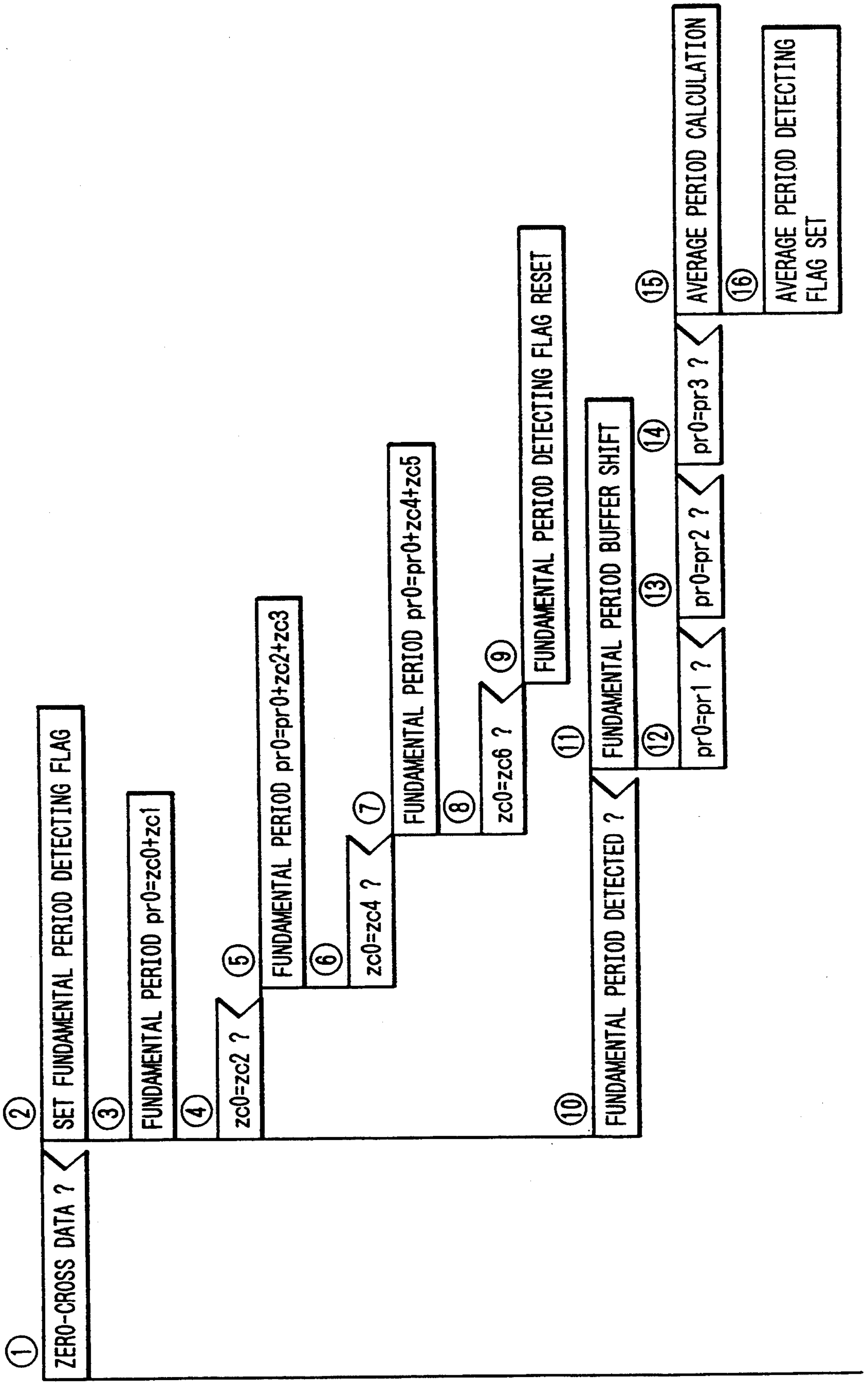
FIG. 6 is a PAD diagram showing the processing of period detecting operation in the above embodiment.

Returning to FIG. 4, the period detecting processing is performed by a fundamental period detecting means 205, an average period detecting means 206, an average period sampling means 207, and a cent value converting means 208. FIG. 6 shows a PAD diagram showing the procedure of period detecting operation carried out in the micro computer 118.

1) FUNDAMENTAL PERIOD DETECTING MEANS 205

Figure 7:
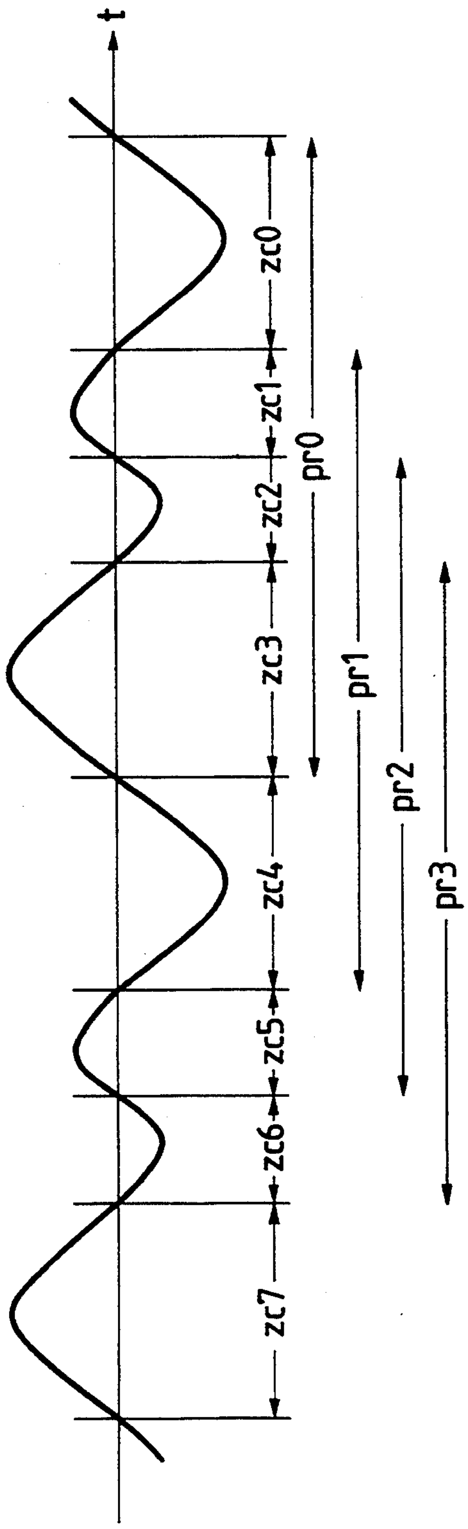
FIG. 7 is a view showing a waveform illustrating the fundamental period detection.

FIG. 7 shows a waveform obtained in the case where the output signal of the low-pass filter means 202 contains zero-cross points influenced by the secondary higher harmonics, together with the processing for obtaining the fundamental period (pt0) based on the zero-cross period (zc0).

The micro computer 118 receives the zero-cross period (zc0) from the DSP 117 and compares this zero-cross period (zc0) with past three zero-cross periods (zc2, zc4, and zc6) successively. And, if the ratio is within a predetermined region, the micro computer 118 obtains the fundamental period (pr0) on the basis of these zero-cross points.

Next, an algorithm for obtaining the fundamental period will be explained with reference to FIG. 6. The DSP 117 transfers the zero-cross period (zc0) to the micro computer 118. This processing is an external interrupt processing for the micro computer 118. The zero-cross period is transferred as 2ch data. If either of two channels is empty, this empty channel transfers the dummy data "0000". If the "0000" data is included, the micro computer 118 rejects the period detecting processing. In FIG. 6. if the zero-cross data is contained (Step 1), a fundamental period detecting flag (ZP) is temporarily set. (Step 2) Then, zc0+zc1 is checked as one candidate for the fundamental period. (Step 3) If the zero-cross points are generated based on the fundamental wave component alone, this zc0+zc1 would be identified as the fundamental period. In this case, as zc0 and zc2 are adjacent negative waveforms, it is expected that these zc0 and zc2 have the same period. However, the zc0 and zc2 shown in FIG. 7 are apparently different from each other. Thus, the probability of becoming the fundamental period is denied with respect to the zc0+zc1. (Step 4)

Next, zc0+zc1+zc2+zc3 is checked as one candidate for the fundamental period. (Step 5) In the same manner as the previous processing, zc0 and zc4 are compared with each other. As apparent from FIG. 7 these zc0 and zc4 are substantially the same with each other; therefore, zc0+zc1+zc2+zc3 is identified as the fundamental period. (Step 6) If the zc0 and zc4 are apparently different from each other, zc0+zc1+zc2+zc3+zc4+zc5 is subsequently checked as another candidate for the fundamental period. (Step 7) And, the zc0 is compared with zc6. (Step 8) If the zc0 and zc6 are apparently different from each other, it is concluded that no fundamental period is detected and the fundamental period detecting flag (ZP) is reset. (Step 9)

2) AVERAGE PERIOD DETECTING MEANS 206

In order to check the error detection, the detected fundamental period (pr0) is compared with past three fundamental periods (pr1-pr3) by making a judgement as to whether or not the ratio is within a predetermined region. If no error is detected, these four fundamental periods are averaged to obtain an average period (apr0). Above processing is performed every time the micro computer 118 receives a zero-cross period from the DSP 117.

Next, an algorithm for detecting the average period will be explained with reference to the remaining part of FIG. 6. According to the fundamental period detecting flag, a judgement is made as to whether or not the fundamental period is detected based on the presently received zero-cross period. (Step 10) If the fundamental period is detected, the fundamental period buffer shift operation is carried out in such a manner that the past fundamental periods pr0–pr2 are successively renewed as pr1–pr3, respectively, and the latest fundamental period is newly assigned as prO. (Step 11)

Then, the latest fundamental period (prO) is compared with each of the past three fundamental periods (pr1-pr3). (Steps 12–14) If the ratio of these fundamental periods is within the predetermined region in each comparison, it is recognized that these fundamental periods are effective. Thereafter, an average period is calculated (Step 15) and an average period detecting flag is set (Step 16).

3) AVERAGE PERIOD SAMPLING MEANS 207

Next, an average period sampling operation will be explained. The micro computer 118 checks, at a constant interval (approximately 10 ms), as to whether or not the average period detecting flag is set. If the average period detecting flag is set, the micro computer 118 samples the average period and compares it with the preceding average period (aprl). If the ratio of these average periods is within a predetermined region, these average periods are recognized as effective. Subsequently, the newly obtained average period is stored in the buffer and the average period detecting flag is reset.

4) CENT' VALUE CONVERTING MEANS 208

If effectiveness of the average period is recognized, the average period (apr0) is transformed into the frequency and, thereafter, is converted into the cent' value. Assuming that the period is t[s], the cent' value is expressed in accordance with the following equation (1).

$$c=1024 * \log_2(t0/t),\ t0=1/55 \qquad (1)$$

As a practical conversion method a table would be recommendable, in which the average period is referred to as an index for reading out a corresponding cent' value.

Thus obtained cent' value becomes a pitch value outputted from each of the first and second pitch detecting means 103 and 105.

Next, the processing carried out in the calculating means 106 will be explained with reference to FIGS. 8(A)–8(E) and 9.

Figure 8A:
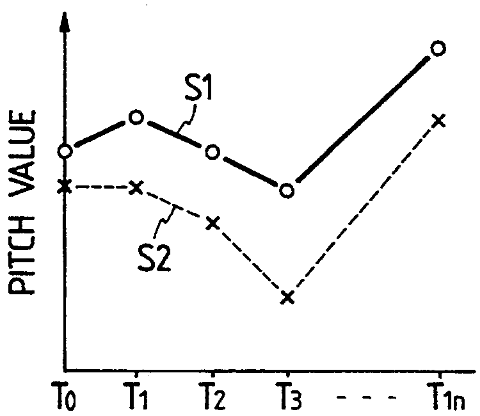
FIGS. 8(A)–8(E) are views showing operations of the pitch detecting means and the calculating means of the above embodiment.

In FIG. 8(A), S1 and S2 represent the pitch values generated from the first and second pitch detecting means 103 and 105, respectively. FIG. 8(A) shows the time variation of pitch value, which is dispersive as explained previously.

Figure 8B:
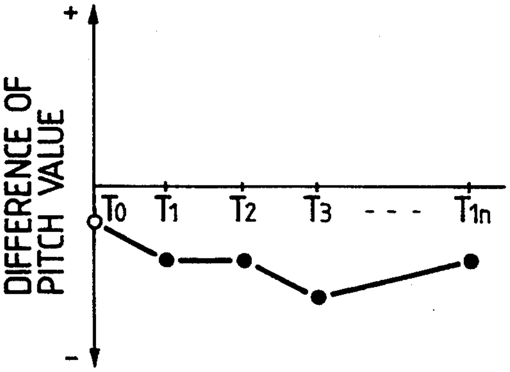
Figure 8C:
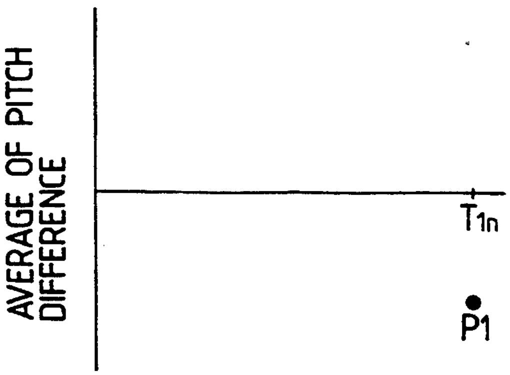

Although the calculating means 106 obtains subtracted and time-averaged values on the basis of the signals S1 and S2, the following two methods would be used. One method is characterized in that a pitch difference is first of all obtained with respect to each pair of pitch values detected at the same time and, thereafter, a time-average of thus obtained pitch differences is obtained as shown in FIG. 8(A), 8(B), and 8(C) .

Figure 8D:
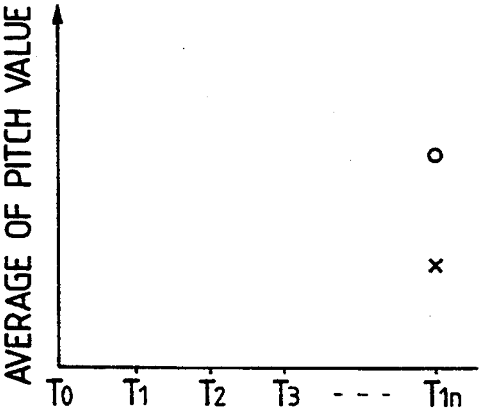
Figure 8E:
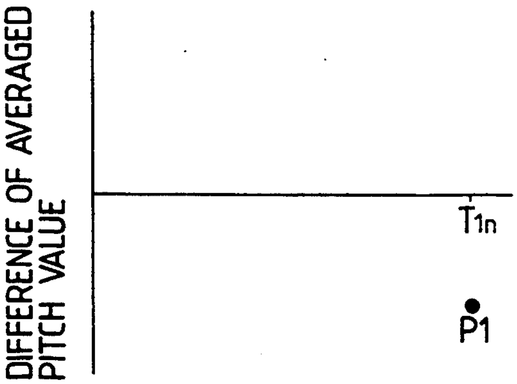

The other method is characterized in that a time-average of each pitch value is first of all obtained and, then, a difference of two time-averaged pitch values is obtained as shown in FIGS. 8(A), 8(D), and 8(E). In any of these two methods, the finally obtained is the same value P1.

Figure 9:
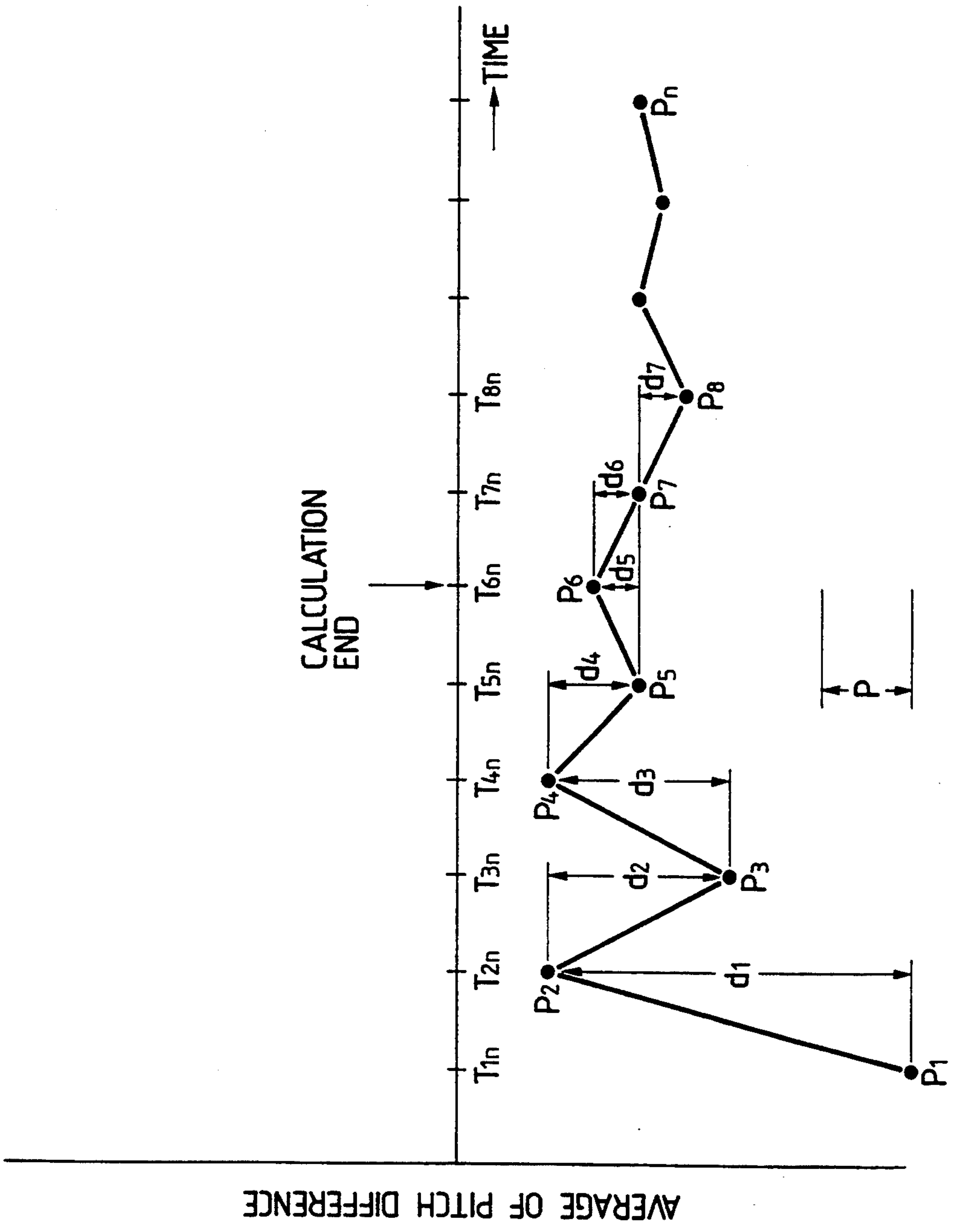
FIG. 9 is a view showing an operation of the calculating means in accordance with the above embodiment.

FIG. 9 shows one method of calculating a control signal Sd, used for controlling the interval adjusting means 107, on the basis of average Pn of the pitch differences.

As explained with reference to FIGS. 8(*c*) and 8(*e*), the same value P1 is obtained at a time $T_{1n}$. By performing the same procedure, time-average pitch value differences P2, P3, - - -are obtained at corresponding times $T_{2n}$, $T_{3n}$, - - -, respectively, as shown in FIG. 9. Subsequently, differences d1, d2, - - - between adjacent two of above obtained values P1, P2, - - - are successively obtained. If it is found that a difference $d_k$ is equal to or less than a predetermined value P, the calculating means 106 terminates its calculating operation at this moment and outputs a value of the next time-averaged pitch value difference $P_{k+1}$ as the control signal Sd for controlling the interval adjusting means 107. In FIG. 9, as the difference d5 is less than P, the time-averaged pitch value difference P6 is specified as the control signal Sd for controlling the interval adjusting means 107.

For example, if the singing or play signal collected by the microphone 104 has a pitch smaller than that of the singing or play signal recorded in the laser disk by an amount P6, the output signal Sd from the calculating means 106 controls the interval adjusting means 107 to reduce the key by the same amount P6. On the contrary, if the singing or play signal collected by the microphone 104 has a pitch larger than that of the singing or play signal recorded in the laser disk by an amount P7, the output signal Sd from the calculating means 106 controls the interval adjusting means 107 to increase the key by the same amount P7.

There are various kinds of music training apparatus commercially available. Although the present invention is explained with respect to the analogue sound laser disk based on the sound multiplex system, there are many other recording mediums such as a digital sound laser disk, a compact disk or a tape based on the ordinary stereo recording system, and a compact disk or a tape based on the sound multiplex system.

In case of the digital sound laser disk, an accompaniment music is stereo recorded in both Lch and Rch. Therefore, the interval adjusting means and the adding means need to be provided independently or exclusively for each of the Lch and Rch.

In case of the compact disk or tape based on the ordinary stereo recording system, an accompaniment music can be picked up by canceling the in-phase components of sound frequency band between the Lch and Rch. The singing signal can be picked up by use of the signal separating means 102 through which the components of sound frequency band are added between the Lch and Rch.

In case of the compact disk or tape based on the sound multiplex system, the signal separating means 102 will be unnecessary because the Lch records the accompaniment music and the Rch records the singing signal independently.

Furthermore, it is needless to say that the music training apparatus in accordance with the present invention is used for training of musical instruments as well as songs. Therefore, in the case where the user plays a musical instrument, an electric output signal of the musical instrument can be directly inputted into the music training apparatus without using the microphone 104.

As this invention may be embodied in several forms without departing from the spirit of essential characteristics thereof, the present embodiment is therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. A music training apparatus comprising:

reproduction means for reproducing a recording medium memorizing accompaniment music;

first pitch detecting means for detecting a pitch of a first signal outputted from said reproduction means;

input terminal means for inputting a second signal representing user's musical signal;

second pitch detecting means for detecting a pitch of said second signal;

calculating means for obtaining time-averaged values of output signals from said first and second pitch detecting means and obtaining subtraction of the time-averaged values obtained;

interval adjusting means inputting an output signal from said reproduction means for changing a frequency ratio of its output signal to its input signal in response to an output signal from said calculating means;

adding means for adding an output signal from said interval adjusting means and said second signal;

start signal input means for inputting a start signal;

feed forward control means for controlling said reproduction means in response to the start signal received by said start signal input means so as to feed forward said recording medium to a starting point of said first signal;

first reproduction control means initiating its operation in response to an operation finish signal fed from said feed forward control means for performing a reproduction of said recording medium from said starting point of said first signal until said calculating means completes its calculating operation;

rewind control means initiating its rewind operation in response to an operation finish signal fed from said first reproduction control means and a calculation finish signal fed from said calculating means for rewinding said recording medium to a head of the corresponding music;

second reproduction control means initiating its operation in response to an operation finish signal fed from said rewind control means for performing an ordinary reproduction of said recording medium from said head of the corresponding music;

output signal ON/OFF means for gate controlling the output signal of said interval adjusting means; and ON/OFF control means for deactivating said output signal ON/OFF means in an OFF condition after said start signal is inputted from said start signal input means until said rewind control means completes its rewind operation, and activating the same in an ON condition when said second reproduction control means performs the ordinary reproduction.

2. A music training apparatus in accordance with claim 1, wherein said interval adjusting means reduces the frequency ratio of its output signal to its input signal when the pitch of said second signal fed from said input terminal means is smaller than the pitch of said first signal fed from said reproduction means, and increases said frequency ratio of its output signal to its input signal when the pitch of the second signal is larger than the pitch of said first signal.

3. A music training apparatus in accordance with claim 1, wherein said interval adjusting means adjusts the frequency ratio of its output signal to its input signal to be substantially the same as a ratio of the pitch of said second signal to the pitch of said first signal.

4. A music training apparatus in accordance with claim 1, wherein the pitch detected in said first pitch detecting means is a time-averaged value obtained by using simultaneously obtained values alone with respect to the frequency of the signal inputted to said first pitch detecting means.

5. A music training apparatus in accordance with claim 1, wherein said interval adjusting means adjusts the frequency ratio of its output signal to its input signal to be substantially the same as a pitch ratio of said second signal to said first signal obtained at the time when a time-base change of said pitch ratio of said second signal to said first signal becomes equal to or less than a predetermined value.

6. A music training apparatus in accordance with claim 1, wherein the pitch detected in said first pitch detecting means is a time-averaged value of the frequency of the signal inputted to said first pitch detecting means.

7. A music training apparatus in accordance with claim 1, wherein said reproduction means performs a two-part reproduction including first and second parts, in which said first part allows a video signal to be reproduced on a display unit but prohibits a sound signal to be generated from a speaker.

8. A music training apparatus comprising:

reproduction means for reproducing a recording medium memorizing accompaniment music;

signal separating means for separating a musical signal from an output signal of said reproduction means;

first pitch detecting means for detecting a pitch of a first signal outputted from said signal separating means;

input terminal means for inputting a second signal representing user's musical signal;

second pitch detecting means for detecting a pitch of said second signal;

calculating means for obtaining time-averaged values of output signals from said first and second pitch detecting means and obtaining subtraction of the time-averaged values obtained;

interval adjusting means inputting an output signal from said reproduction means for changing a frequency ratio of its output signal to its input signal in response to an output signal from said calculating means;

adding means for adding an output signal from said interval adjusting means and said second signal;

start signal input means for inputting a start signal;

feed forward control means for controlling said reproduction means in response to the start signal received by said start signal input means so as to feed forward said recording medium to a starting point of said first signal;

first reproduction control means initiating its operation in response to an operation finish signal fed from said feed forward control means for performing a reproduction of said recording medium from said starting point of said first signal until said calculating means completes its calculating operation;

rewind control means initiating its operation in response to an operation finish signal fed from said first reproduction control means and a calculation finish signal fed from said calculating means for rewinding said recording medium to a head of the corresponding music;

second reproduction control means initiating its operation in response to an operation finish signal fed from said rewind control means for performing an ordinary reproduction of said recording medium from said head of the corresponding music;

output signal ON/OFF means for gate controlling the output signal of said interval adjusting means; and ON/OFF control means for deactivating said output signal ON/OFF means in an OFF condition after said start signal is inputted into said start signal input means until said rewind control means completes its rewind operation, and activating the same in an ON condition when said second reproduction control means performs the ordinary reproduction.

9. A music training apparatus comprising:

reproduction means for reproducing a recording medium memorizing accompaniment music;

first pitch detecting means for detecting a pitch of a first signal outputted from said reproduction means;

input terminal means for inputting a second signal representing user's musical signal;

second pitch detecting means for detecting a pitch of said second signal;

comparing means for comparing output signals from said first and second pitch detecting means;

interval adjusting means inputting an output signal from said reproduction means for changing a frequency ratio of its output signal to its input signal in response to an output signal from said comparing means;

output signal ON/OFF means for gate controlling an output signal of said interval adjusting means in response to a gate control signal;

control means for controlling said reproduction means and said output signal ON/OFF means; and adding means for adding the output signal from said interval adjusting means and said second signal.

10. A music training apparatus in accordance with claim 9, wherein said reproduction means performs a two-part reproduction including first and second parts, in which the first part is like a trial part which allows a video signal to be reproduced on a display unit but prohibits a sound signal to be generated from a speaker and the second part is like a formal part which allows an ordinary reproduction of both the video and sound signals.

11. A music training apparatus in accordance with claim 10, wherein said comparing means compares a time-averaged value of the pitch between said first and second signals during the first part, and said interval adjusting means changes key of the accompaniment music in accordance with the difference of pitch between the first and second signals so as to be in perfect pitch with each other before terminating the first part.

12. A music training apparatus in accordance with claim 11, wherein said control means generates said gate signal after said interval adjusting means completes key change operation and said output signal ON/OFF means is activated into an ON condition in response to said gate signal.

13. A music training apparatus in accordance with claim 12, wherein, in the second part of ordinary reproduction of the video signal and sound signal, said control means causes said reproduction means to formally start sound signal reproduction through the speaker from a head of the accompaniment music under a condition where the interval is automatically and exactly adjusted to fit to the user's singing or play sound.

14. A music training apparatus comprising:

reproduction means for reproducing a recording medium memorizing accompaniment music;

signal separating means for separating a musical signal from an output signal of said reproduction means;

first pitch detecting means for detecting a pitch of a first signal outputted from said signal separating means;

input terminal means for inputting a second signal representing user's musical signal;

second pitch detecting means for detecting a pitch of said second signal;

comparing means for comparing output signals from said first and second pitch detecting means;

interval adjusting means inputting an output signal from said reproduction means for changing a frequency ratio of its output signal to its input signal in response to an output signal from the comparing means;

output signal ON/OFF means for gate controlling an output signal of the interval adjusting means in response to a gate control signal;

control means for controlling said reproduction means and said output signal ON/OFF means; and adding means for adding the output signal from said interval adjusting means and said second signal.

* * * * *